Figure 1:
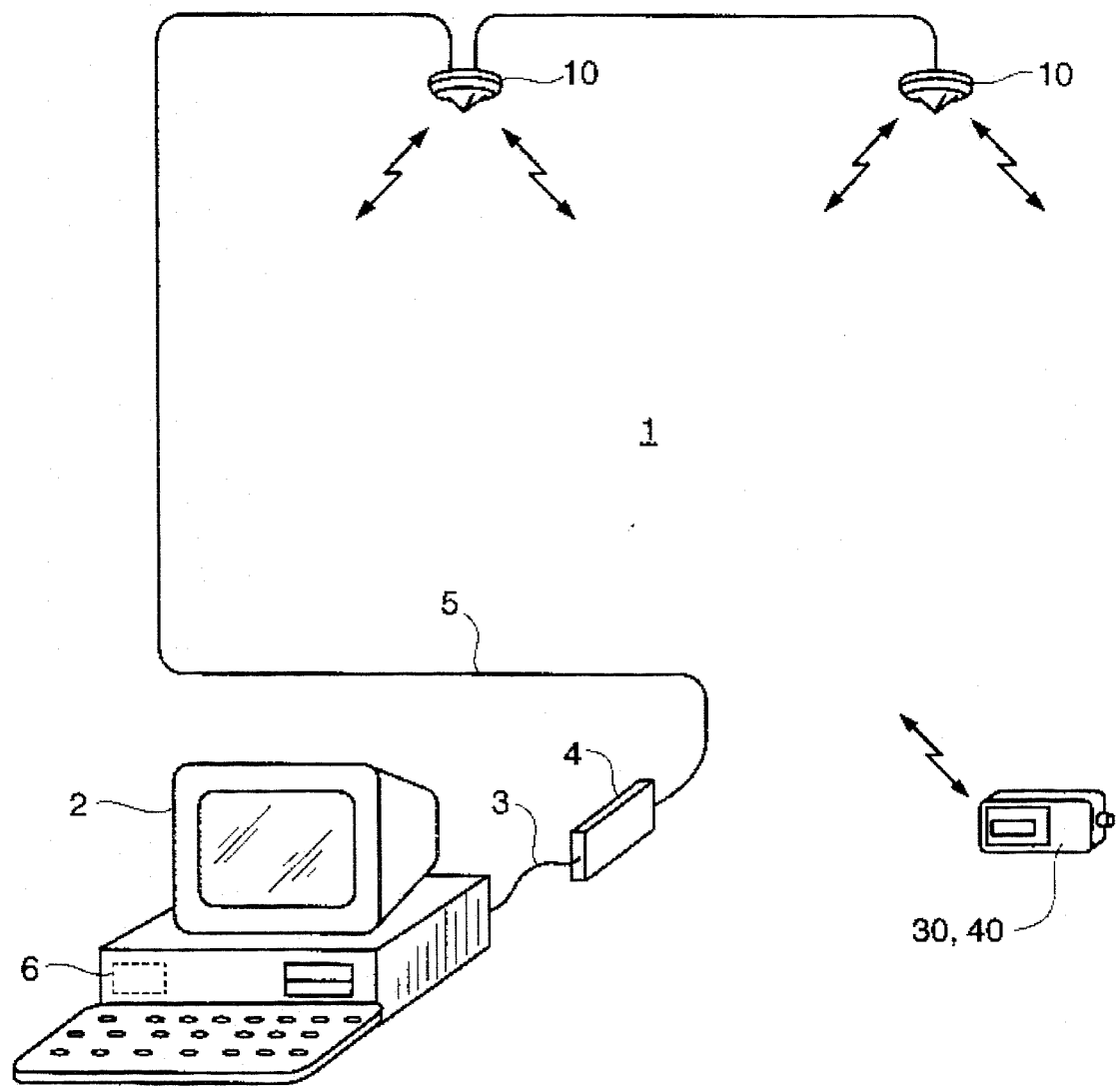

United States Patent [19]

Barfod

[11] Patent Number: 5,539,393
[45] Date of Patent: Jul. 23, 1996

[54] INFORMATION SYSTEM

[75] Inventor: Jesper M. Barfod, Dr. Moelle, Denmark

[73] Assignee: Esel-Krabbe Systems A/S, Kyistgaard, Denmark

[21] Appl. No.: 122,474

[22] PCT Filed: Mar. 20, 1992

[86] PCT No.: PCT/DK92/00090

§ 371 Date: Sep. 21, 1993

§ 102(e) Date: Sep. 21, 1993

[87] PCT Pub. No.: WO92/16901

PCT Pub. Date: Oct. 1, 1992

[30] Foreign Application Priority Data

Mar. 22, 1991 [DK] Denmark ................................. 520/91

[51] Int. Cl.⁶ .............................. H04Q 7/00; G06F 7/04; G06F 7/48
[52] U.S. Cl. ............................ 340/825.520; 340/825.540; 340/825.350; 364/464.010
[58] Field of Search ........................ 340/825.52, 825.54, 340/825.55, 825.35; 364/401, 464.01; 235/375, 383, 385

[56] References Cited

U.S. PATENT DOCUMENTS

| | | | |
|---|---|---|---|
| 4,002,886 | 1/1977 | Sundelin | 235/61.7 R |
| 4,521,677 | 6/1985 | Sarwin | 235/385 |
| 4,717,913 | 1/1988 | Elger | 340/825.54 |
| 4,766,295 | 8/1988 | Davis et al. | 235/383 |
| 4,879,756 | 11/1989 | Stevens et al. | 340/825.54 |
| 4,888,709 | 12/1989 | Revesz et al. | 340/825.35 |
| 4,937,586 | 6/1990 | Stevens et al. | 343/702 |
| 4,962,466 | 10/1990 | Revesz et al. | 340/825.35 |
| 5,019,811 | 5/1991 | Olsson et al. | 340/825.35 |
| 5,111,196 | 5/1992 | Hunt | 340/825.35 |
| 5,194,860 | 3/1993 | Jones et al. | 340/825.54 |
| 5,241,657 | 8/1993 | Fine et al. | |
| 5,406,271 | 4/1995 | Sonnendorfer et al. | 340/825.35 |

FOREIGN PATENT DOCUMENTS

| | | |
|---|---|---|
| 461690 | 3/1990 | Sweden . |
| 02477 | 4/1986 | WIPO . |
| 08539 | 6/1991 | WIPO . |

OTHER PUBLICATIONS

Phillip Lighting; Product Brochure: "MCS 100 system"; Europe; Oct. 1990.

Primary Examiner—Alyssa H. Bowler
Assistant Examiner—Mark H. Rinehart
Attorney, Agent, or Firm—Thomas R. Vigil

[57] ABSTRACT

An information system comprises a master station (2, 10) controlling information to be displayed on a number of information units (30, 40) arranged remotely from said master station. The master station broadcasts instructions by modulated infrared signals, and these signals are detected by a photodiode within each information unit (30, 40), said information unit also comprising a receiver and logic circuitry. The information unit (30, 40) further comprises an emitter diode in order that it is capable of acknowledging the receipt of instructions. Information is presented on LCD-type displays, e.g. digits, a graphic field, or other information fields, all being implemented in LCD-type displays. The display units are, in particular, applicable in shops or warehouses, e.g. supermarkets, where a display unit may be arranged adjacent each item of merchandise, serving the purpose of displaying e.g. the unit price on the information unit. The system according to the invention permits an automatic updating of prices and guarantees a reliable functioning through the facility of requesting verification signals to be transmitted from the individual information units.

28 Claims, 6 Drawing Sheets

INFORMATION SYSTEM

The present invention relates to an information system for the presentation of visual information on one or more display units, wherein the information is controlled by a centrally located master station, and wherein each individual display unit is adapted to detect signals transmitted by the master station and to transmit response messages to the master station.

The system concerned is particularly suited for use in shops or warehouses where display units may be arranged adjacent various items of merchandise, e.g. at the front edges of shelves carrying merchandise. The facility for displaying variable information adjacent individual items of merchandise is particularly relevant for e.g. price information, since price information hereby may be updated quickly and automatically. Moreover, it may obviously also be of interest to display other kinds of information adjacent the item of merchandise, e.g. special offers, special sales terms, explanations, advertisements etc. In warehouses, price information is, in many instances, marked directly onto individual items of merchandise, involving heavy costs to the labor necessary for the marking, and making it difficult to alter the prices. Price alterations are, however, frequently desirable due to variations in wholesale prices or due to competition.

In some warehouses, prices are displayed on poster boards placed adjacent to groups of goods, which method still involves substantial labor by the set-up and the revision of the price posters and yet involves the risk of unauthorized manipulation of the posters, causing inconvenience for later customers. An automatic information system could mean substantial savings in labor costs and could also permit a more active marketing strategy. The implementation of this kind of automatic system has, however, encountered very substantial practical and technical difficulties. Firstly, display units should be provided at minimal costs, in view of the substantial number of goods items offered for sale. Secondly, frequent service requirements are not acceptable. In warehouses or in supermarkets, shelves, stands and racks for merchandise must be easily movable, as movements are frequent, and hard wiring to individual display units is consequently not practically feasible. In cases with wireless diplay units, it is, however, difficult to guarantee an adequate power supply or to guarantee reliable communication. Conditions for wireless transmission may be greatly varying, and may even vary from one display unit to another. One-way communication will hardly be acceptable. A facility for responding is required for the purpose of verifying from a central location that the display units have perceived the instructions correctly.

U.S. Pat. No. 4,002,886 discloses an electronic price information system where the shelves are provided with electric bus conductors carrying cables for power supply as well as cables for information signals, the various display units being connected to these bus conductors during the set-up. Each display unit is associated with an individual address code, and a centrally located master station may broadcast messages addressed to individual display units.

WO published patent application no. 86/02477 discloses an information system comprising display units adapted for placement on the edges of shelves located in shops or warehouses or the like, where each individual display unit is provided with an internal power source, a memory with an individual address, and a receiver for infrared communication. A master station may broadcast price instructions addressed to individual displays for display. Upon a special command, the display may temporarily change so as to show some other kind of information stored in its memory. This published application also mentions a portable control unit, by which an operator may instruct display units individually.

U.S. Pat. No. 4,937,586 discloses a price information system for warehouses, by which individual displays are battery-powered and adapted to receive radio signals in the frequency band 10–500 kHz, said signals being addressed to an individual display or to a group of displays. The individual displays may also retransmit a response radio signal. The base station transmits the radio signals by horizontal loop antennae. This kind of system requires extensive cabling as the antenna loops must effectively circumscribe the total area of the warehouse. This kind of system suffers from poor noise suppression and poor power efficiency, making comparatively heavy demands on the power capacity in the individual displays.

U.S. Pat. No. 4,766,295 discloses an electronic pricing display system wherein battery-operated shelf display tags receive remotely transmitted, addressed infrared signals from optical heads. The receiver section within each display tag is capable of operating in a high-gain mode and in a low-gain mode, the high-gain mode being energized periodically. The wireless display tag has the capability of transmitting within its immediate vicinity certain information, which may be received by a capacitively coupled handheld receiver carried by personnel in such immediate vicinity. A handheld battery-powered controller may, while it is in the immediate vicinity of a display tag, receive information from the display tag and transmit information to the wireless tag for changing the address of the tag or altering the information displayed by the display tag.

The operation of individual displays based on an individual, internal battery power supply puts severe limits to the electric power available and makes it difficult to guarantee a satisfactory communication, in particular regarding communication in the direction from the wireless diplays. Radio wave communication is a possible method, but the frequency bands that may be allocated for this type of radio communication are severely restricted and specified in great detail, and these regulations even vary substantially from one country to another. Information systems based upon this principle will, therefore, have to be tailored specifically to the specific country in which the system is to be operated. Another disadvantage by radio communication is that the radio waves dissipate through the walls of a building, so that the broadcast signals may spill over and may be monitored outside the area in which they were intended to be used, and could be a cause for interference to other parties. Conversely radio waves from the outside could pass into a building housing an information system and interfere with the operation of the system. Frequency bands that could realistically be used and allowed in most countries would be in the range of above 400 MHz, which bands, however, are disadvantageous by putting comparatively great demands on the power supply in the receivers.

Another communication method could be ultra sound waves, but also in this case, noise sources are plenty; and the power efficiency is comparatively low, necessitating a comparatively high transmission power.

The present invention provides an information system comprising a master station adapted for emitting an infrared signal and for detecting an infrared signal together with at least one information unit for the presentation of visual information, said information unit comprising a visual display and a digital memory, said information unit being adapted to receive an infrared signal, to transmit an infrared signal, and to present on its display a piece of information dependent upon a signal emitted from the master station, said information unit being capable of detecting a special interrogation signal emitted by the master station and adapted to respond hereto by emitting a verification signal, said master station being capable of receiving and detecting said verification signal.

Hereby a system is provided, by which the reliability is satisfactory, since the master station may verify the correct function of the individual display units, and since a high-capacity and satisfactory communication may be provided without any risk of dissipating the signals outside of the desired zone, and yet without any substantial risk of encountering interference from other signals. Response signals from individual displays are only emitted upon demand from the master station, whereby power is saved since an individual display unit does not have to respond to each and every command received. By the broadcast of common instructions general for several display units, there is no desire of immediate acknowledgement, since a number of response messages might interfere with or mask one another. The information system may be used for presenting information, e.g. prices and special offers, to customers, and it may also be used for presenting information to service personnel when required, e.g. showing a shelf stock lay-out plan for a merchandise item, the quantity in stock, reordering level etc. The master station may be stationary or portable.

According to a preferred embodiment, each information unit may, in addition to an individual address, be associated with a group address so as to make it possible to address a command to a group of information units. A group address may e.g. be a number identifying a particular item of merchandise, e.g. a standardized bar code number such as EAN (European Article Number) or UPC (Universal Product Code), which may be advantageous in case the same kind of merchandise is presented in several places in the shop, since the price information could then be broadcast to the information units arranged adjacent precisely this kind of merchandise.

According to a preferred embodiment, the information unit is adapted to respond to a special instruction by turning off its display and to respond to another special instruction by turning on the display again. This may be used advantageously in the way that the master station may turn off all displays at the end of the shopping hours and may turn them on at the commencement of the next opening hours, in order to keep the power consumption in the individual information units to a minimum.

According to another preferred embodiment, the information unit comprises an internal timer, and the unit is adapted to respond to a special instruction by turning off the power supply for its receiver circuit for a predetermined interval of time. According to a further preferred embodiment, the interval of time during which the individual display unit keeps its receiver circuit turned off may be remotely programmed by a special instruction from the master station. By turning off the receiver circuit, when its operation is not required, power is saved in the display unit. By remotely programming the power-off time interval, it is possible to turn off all receiver circuits in the information system at the end of shop opening hours in a way so that they automatically power up shortly before the commencement of the next opening hours. The price displays may be activated either by the timer function or by a central instruction broadcast from the master station after the instant where the receiver circuits have been reactivated.

According to a preferred embodiment, each information display unit is adapted to store status information in a memory and to transmit status information in response to a special interrogation signal. This allows the use of an advantageous communication strategy, e.g. by turning on all displays at the commencement of shopping hours by a general command, whereafter the master station turns to sequentially polling the individual displays for status. In this way, all displays or possibly a group of displays may be instructed to perform some operations simultaneously, whereas the more time-consuming polling operation may be deferred until some other and more convenient time.

According to a preferred embodiment, the master station comprises at least one transmission station adapted to transmit and receive infrared signals. The transmission station may be arranged at a suitable location, e.g. just below the ceiling, in order to ensure the best possible wireless link to the individual display units. In case of large areas, several transmission stations may be arranged in order to ensure complete coverage.

According to a further preferred embodiment, the information system further comprises a portable controller with push buttons for manual operation and adapted to emit an infrared signal upon activation, which signal is directionally delimited so that it may be directed towards and received by a single information unit without other information units responding hereto. With this kind of portable control unit, an operator may walk around inspecting shelves and communicating with various displays, one at a time. This communication may comprise turning on a turned-off display or calling up service-related information, e.g. information about how a particular item of merchandise should be stocked on the shelf, stock information, reordering information etc. As the display tag is capable of a two-way communication with the master station, it is also possible, by means of the portable controller, to communicate through the display with the master station, e.g. to place merchandise orders or to acknowledge the inspection of a particular shelf.

The invention further provides an information unit for the presentation of visual information, comprising a visual display and a digital memory and adapted for receiving an infrared signal and for transmitting an infrared signal, said information unit being adapted to show on its display information dependent upon a received infrared signal and being adapted to detect a special interrogation signal and to respond to said interrogation signal by emitting a verification signal.

The invention provides a portable unit adapted to emit upon manual activation an infrared signal, said signal being directionally delimited to a predetermined angular region so that it may be directed towards and received by an information unit located inside said region without information units located outside said region responding hereto.

The invention further provides a method for the presentation of visual information on at least one information unit under control from a master station remote from said information unit, by which method said information unit is adapted to receive an infrared signal and transform it into visual information, by which an infrared signal is emitted from the master station, said signal being detected by the information unit, and by which said information unit upon the detection of a special interrogation signal emits a verification signal.

Figure 2:
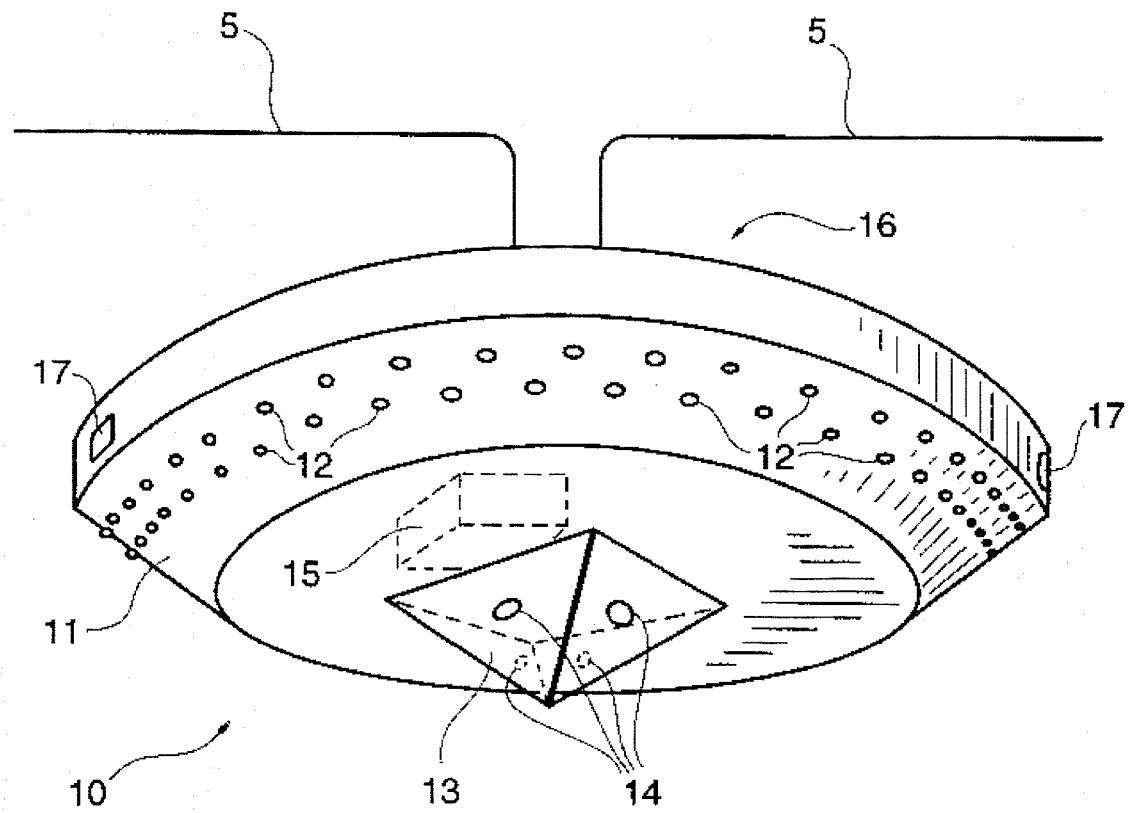
Figure 3:
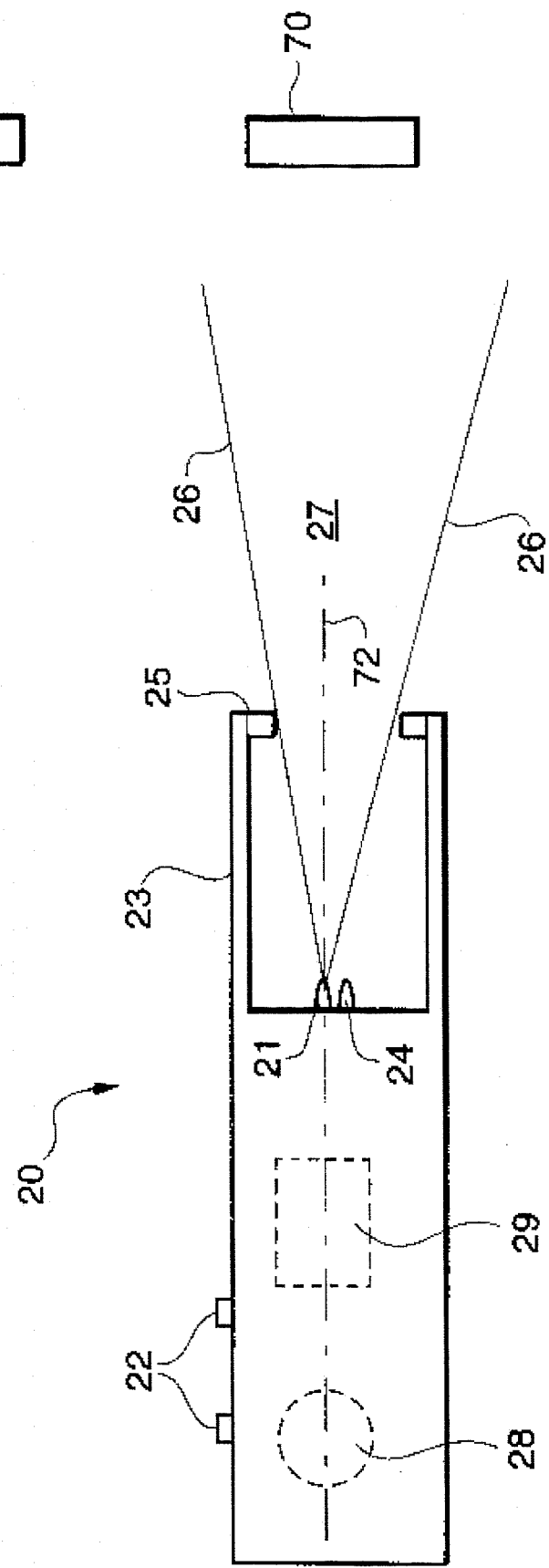
Figure 4:
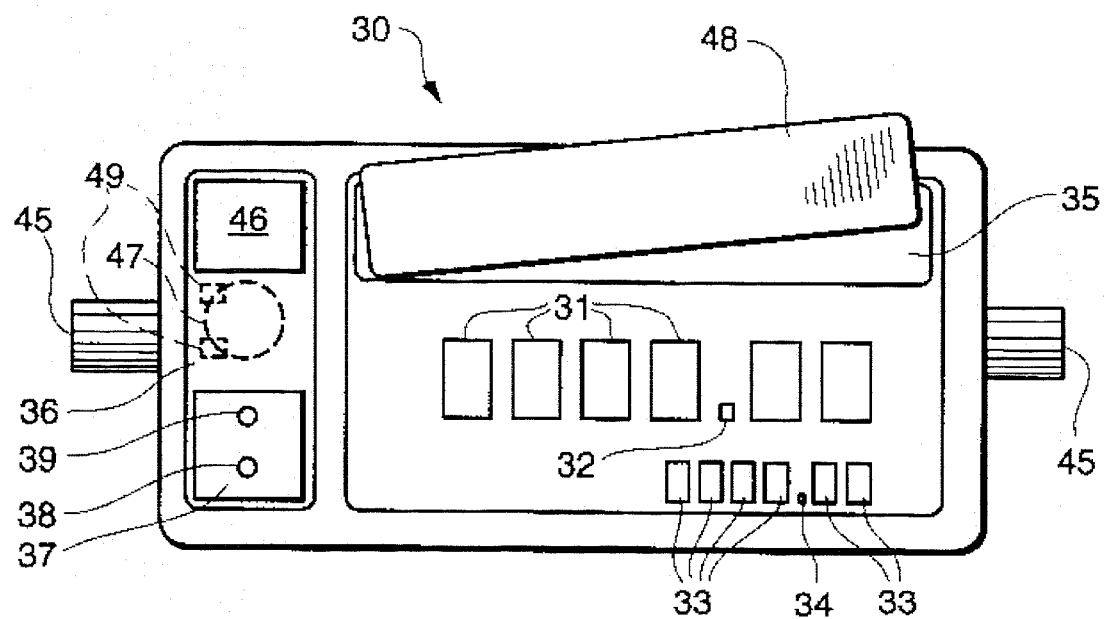
Figure 5:
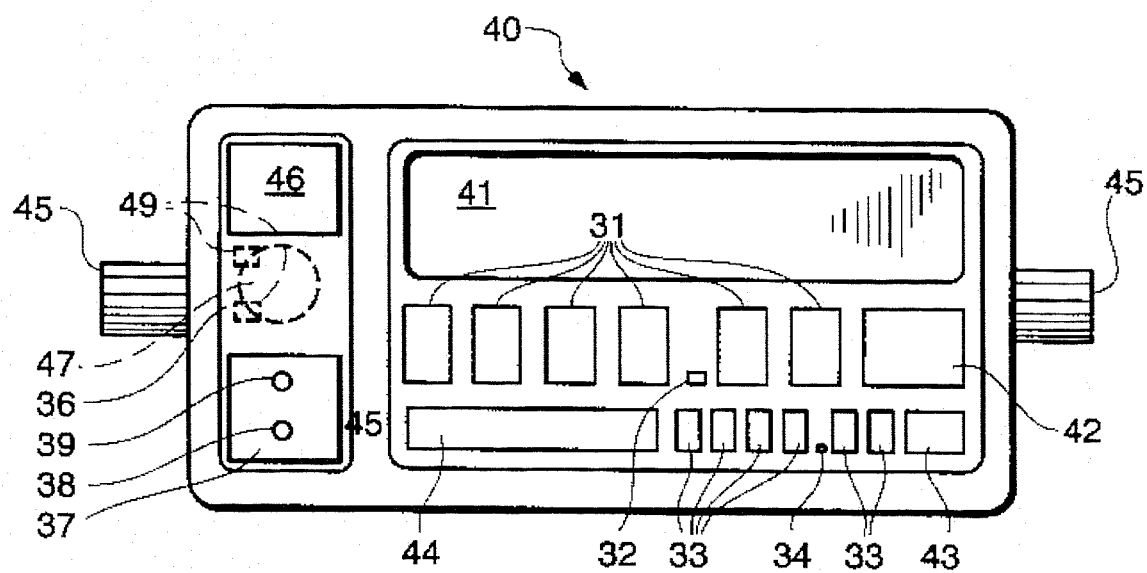
Figure 6:
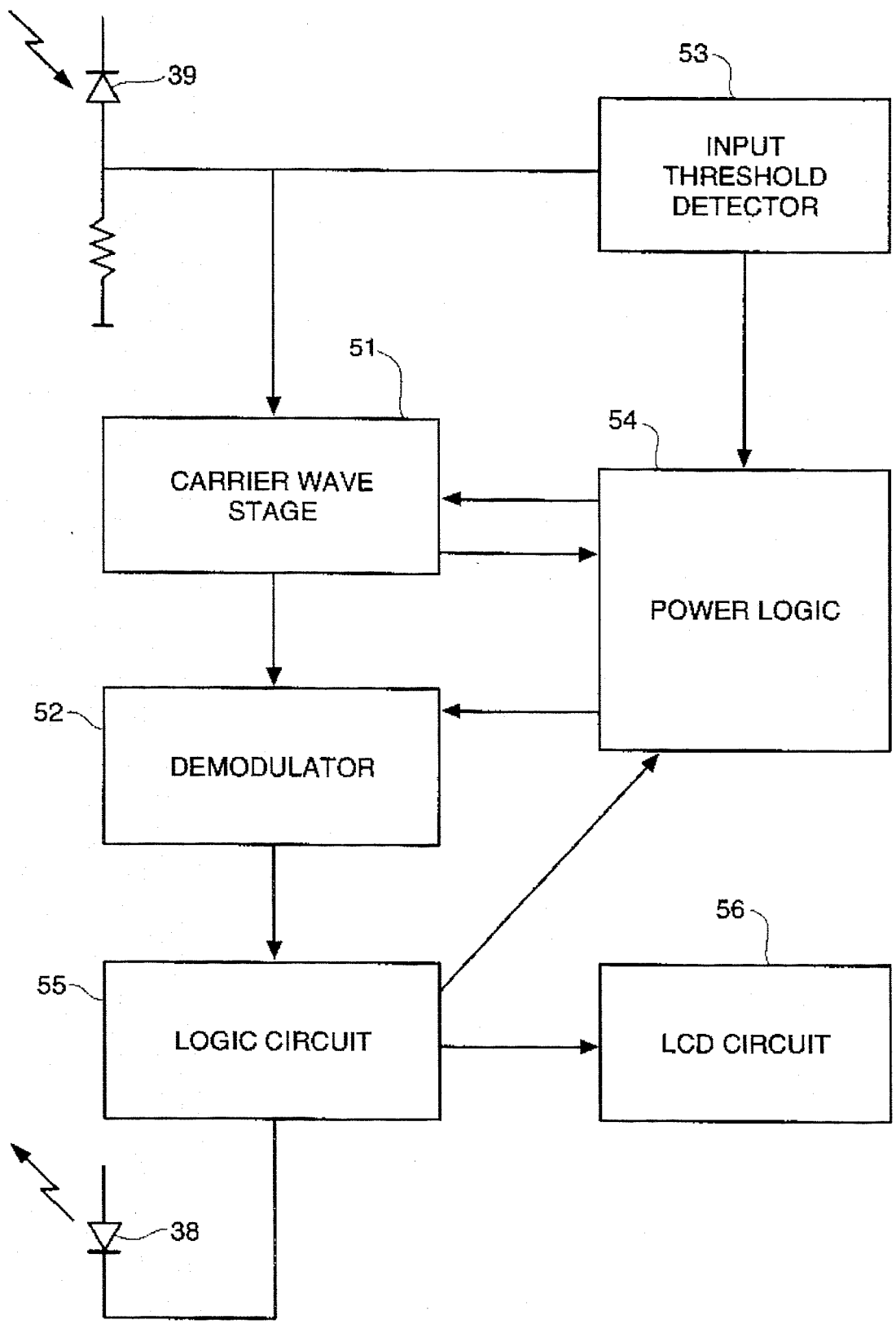
Figure 7:
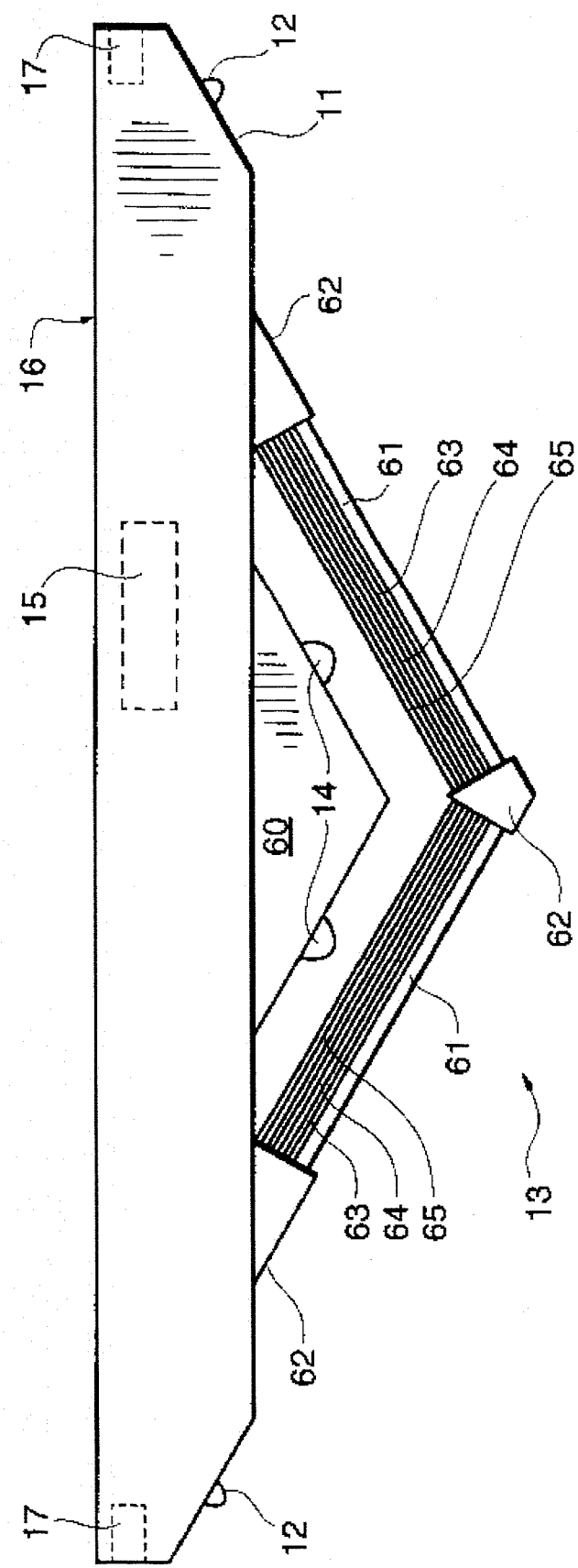

Further details and advantages of the invention will be evident from the following detailed description of preferred embodiments given with reference to the drawing, wherein FIG. 1 is a general view of the master station, FIG. 2 shows a ceiling station, FIG. 3 shows a section through a portable controller confronting two display tags, FIG. 4 shows a shelf display tag for numeric information, FIG. 5 shows a shelf-display tag for numeric and graphic information, FIG. 6 shows a block diagram of the electronic circuitry within a shelf display tag, and FIG. 7 shows a section through a ceiling station.

All Figures are schematic and simplified, showing only details that are essential for the understanding of the invention, all other details being omitted for the sake of clarity. Identical parts are marked with the same reference numerals throughout the Figures.

Reference is first made to FIG. 1 showing a master station 1 essentially comprising a general purpose desktop computer 2, e.g. of the type IBM PC or the like, a driver circuit 4, two ceiling stations 10 and a display tag 30, 40. As shown in FIG. 1, the driver circuit 4 is connected to the computer 2 through an interface cable 3. Alternatively, the driver circuit 4 may be implemented on a plug-in circuit board, which may be arranged inside the casing of the computer 2. From the driver circuit 4, a driver cable 5 provides a connection to one or more ceiling stations 10. FIG. 1 shows two ceiling stations of this kind; and it is obviously possible to expand the system with further ceiling stations if necessary, all being linked together by the driver cable 5, the individual ceiling stations comprising logic circuitry enabling them to be individually addressable from the computer, according to methods known within the art. The driver circuit 5 comprises an electric power supply for the ceiling stations, transmitter and receiver information buffers, a computer interface, alarm lamps, and a generator for providing the transmitters with a synchronization signal at a selected constant frequency. The selected frequency may be equal to the transmission carrier-wave frequency.

The general purpose desktop computer 2 includes storage device 6. The storage device 6 is of the type typically found in general purpose computers and comprises a main memory, i.e., semiconductor memories, etc., and/or auxiliary storage, i.e., fixed disk drive, floppy disk drive, etc. The storage device 6 is used for storing instruction signals and verification signals as well as other general information.

The computer is programmed to store general information such as lists of goods in the store, ware groups, ware descriptions, identification numbers for the individual goods, such as EAN or UPC codes, reordering information, packaging information, lists of display-tag addresses, information about display-tag positions, the types of display tags, journal of updates, shop opening hours etc. The computer is further provided with suitable software, preferably menu-driven, so that an operator may control the information exchanged therefrom. The computer may be provided with software enabling it to print informative lists of ware numbers, location codes, ware information, display tag types, display tags belonging to a particular group of goods, display tags with battery low status, display tags marked out of order, goods without display tags, display tags with which the communication link is found unsatisfactory, display tags awaiting installation, and a list of display tags associated with bar codes etc.

Reference is now made to FIG. 2, which shows a ceiling station 10 in a closer view. The ceiling station is intended to serve as a transmission link to receive signals on the driver cable 5 from the computer and to transform these signals into infrared signals to be transmitted to the display units, and furthermore to detect infrared signals emitted from the display units and to transform them into signals to be forwarded back to the computer via the driver cable 5. In order to allow a maximum of flexibility with regard to the number of ceiling stations, each ceiling station is provided with two cable connector receptacles 17 so that any number of ceiling stations may be connected to the computer by linking them together in a chain with a suitable number of driver cable sections.

The ceiling station is provided with logic, electronic circuitry 15, such as a microprocessor (shown by dotted lines), for controlling the functions and adapted so that the computer may address the ceiling stations individually. The ceiling station may optionally be provided with circuitry for measuring the field amplitude of signals received from the individual display units and for making this information available to the computer. Hereby it is possible for the computer to identify which one of the ceiling stations is having the best connection link with any particular display unit. This information may be utilized for the planning of a transmission strategy and for evaluating the set-up of the ceiling stations.

FIG. 2 shows the ceiling station as seen obliquely from below and illustrates how the station exhibits a generally disc-like form with a planar top surface 16 permitting the station to be mounted with its top surface against the ceiling. Obviously, it is equally well possible to suspend the station at some level below the ceiling, which may be preferred in cases where the ceiling height is greater than the optimum height for the ceiling stations. The disc has an annular tapering zone 11 fitted with a number of transmitter diodes 12 for the emission of infrared light.

The transmitter diodes are generally infrared emitting diodes adapted to emit infrared light at wavelengths in the range from 800 to 1200 nm, and preferably within the range from 840 to 980 nm. According to one particular preferred embodiment, the diodes are of the type GaAlAs adapted to emit light at a wavelength of 870 nm, e.g. of the type Telefunken TSHA 6501. According to another preferred embodiment, the diodes are of the type GaAs such as Siemens LD 271 adapted according to specifications to emit infrared light within a frequency band centered around 950 nm and with 55 nm bandwidth. According to a preferred embodiment, one ceiling station is fitted with e.g. thirty of these transmission diodes 12 arranged in various directions selected with due consideration to the geometric radiation pattern of the diodes in order that the transmission diodes 12 together provide a uniform coverage of the entire angular space below horizontal. One ceiling station is preferably fitted with a number from twenty to fifty transmitter diodes 12.

At a slightly lower level, the ceiling station 10 is provided with a pyramidal region 13 fitted with a number of receiver diodes 14. The receiver diodes may be silicon-based PIN (P Instrinsic N photodiode) diodes adapted for a maximum sensitivity within the range from 730 nm to 1170 nm, and preferably from 840 nm to 980 nm. According to a particular preferred embodiment, the receiver diodes are of the type manufactured by Siemens under the type number SFH 205 Q2 with a maximum sensitivity around a center frequency of 950 nm and within a frequency band of 220 nm bandwidth. These receiver diodes are fitted with a filter adapted for suppressing daylight in order to minimize interference by daylight or other forms of radiation at the diodes in a manner explained in more detail below with reference to FIG. 7. As it may be seen in FIG. 2, four receiver diodes are arranged pointing obliquely downwards in different directions so that they together cover the entire angular region below horizontal substantially uniformly. Possibly, other numbers of receiver diodes, e.g. five or six, may be used. Obviously, other types of receiver diodes may very well be used, and in particular high-sensitivity diodes of the so called large-area type.

According to a preferred embodiment, the transmitter is adapted to emit a 455 kHz carrier-wave signal pulse width modulated with about 1150 Baud of information. According to a preferred embodiment, the receiver is adapted to detect a signal on a 131 kHz carrier-wave, pulse width modulated with about 575 Baud of information. Other frequencies may obviously also be used. The choice of a carrier wave frequency of 455 kHz is advantageous because a wide range of suitable electronic components optimized for this frequency are available on the market at low costs. For the retransmission from the display units and back, lower frequencies are generally preferred in order to obtain a higher power efficiency so as to make less demand on the power capacity in the transmitters. By experiments it has been found that noise may be significant at frequencies below 80 kHz. Obviously, local conditions may imply noise sources which would be suppressed better by selecting different frequency ranges. The presently preferred frequency range for the transmission in the direction from the display units and back is 10 to 400 kHz.

Reference is now made to FIG. 3, which is a longitudinal section through a portable controller confronting two display tags. The portable controller 20 is fitted with one transmitter diode 21 adapted to emit a directionally delimited infrared radiation signal upon activation of one or more push buttons 22. The transmitter diode 21 may be of the same type as the transmitter diodes in the ceiling station. Surrounding the transmitter diode and extending towards the right, the portable unit is provided with a shield 23 with an opening towards the right surrounded by a rim 25 serving the purpose of allowing the infrared signal to be emitted in the direction towards the right within a limited angular region 27 centered around a longitudinal axis 72 of the controller and with the emitter diode 21 at the apex, while keeping the field strength of emitted signals outside said angular region to a minimum.

The portable controller 20 is designed to be used by an operator approaching a display unit, pointing the portable controller towards the display unit, and causing a signal to be emitted. According to a preferred embodiment, the aperture rim 25 is made of soft, flexible material and adapted so that it may be pressed into contact with the front surface of a display tag with the opening of the aperture rim 25 covering the emitter diode and the detector diode of the display tag. The field strength of the emitted signal, as detected by the detector diode in a display tag located in front of the portable controller, may be substantial due to the close range. The portable controller 20 is powered by an internal battery 28 (shown in phantom) and incorporates electronic circuitry 29 (also shown in phantom) to control its functions.

The inner edge of the aperture rim 25 together with the emitter diode 21 effectively defines a bordering line 26 defining the limit of the angular region 27, wherein light may be radiated directly from the transmitter diode 21. FIG. 3 shows the handheld controller confronting two display tags 70 and 71, the first display tag 70 lying inside the emission region 27 and the second display tag 71 lying outside this region. FIG. 3 clearly illustrates how a particular display tag may be addressed by the portable controller merely by pointing the controller directly towards the display tag at short range, and without this communication being emitted to other display tags, provided they are located just a short distance away. The handheld controller may conveniently be used for entering or modifying the address code in a display tag as it is important that the address code will be unique for the particular display tag desired. Other signals which may be emitted from the portable controller may comprise an instruction to the display unit to power up various functions, an instruction to display particular service-related information, or a piece of information for the diplay unit to store in its memory for later retransmission to the master station. According to one particular preferred embodiment, the portable controller 20 is adapted so that it is capable of emitting just a simple instruction to power up the display unit receiver circuitry.

The portable controller is further fitted with one receiver diode 24 located close to the emitter diode and adapted to detect an infrared signal emitted from a display unit when this unit is in a position in which it may receive signals emitted from the portable controller. The receiver diode may be of the same type as the receiver diodes in the ceiling stations and may be provided with similar color filters (described below with reference to FIG. 7).

According to other embodiments (not shown), the portable unit may be implemented with more sophisticated functions, possibly comprising a display for showing information received from the display unit and possibly for communicating directly with the ceiling stations. According to a preferred embodiment, the portable unit includes the full range of the function capabilities of a master station.

Reference is now made to FIG. 4, showing a shelf display tag for numerical information 30. As illustrated in FIG. 4, this shelf display tag 30 comprises six large-size digits 31 with a corresponding decimal point 32 and six small-size digits 33 with a small decimal point 34. These digital displays are LCD digits controlled by electronic circuitry within the shelf display tag 30 in a way to be explained in greater detail below. Above the two numerical displays, a blank field 35 is arranged, on which e.g. a cardboard label 48 may be fitted, which cardboard label may be used for displaying information that does not require any electronic updating. Power may be supplied to internal electric circuitry (to be explained below with reference to FIG. 6) through electric power terminals 49 from an internal battery 47 (shown in phantom). To the left-hand side, the display tag is provided with a solar cell 46 for collecting energy from irradiated light or other electromagnetic waves and converting the received energy into electric power, which is charged into the internal battery 47 (shown in phantom). According to another embodiment of the display tag (not shown), the solar cell is left out and power solely provided from the battery or from other sources.

Below the solar cell, the display tag is provided with a logo field 36 adapted for the attachment of or marking of e.g. a company logo, and below this field, the display tag is provided with an infrared transparent window 37 covering an emitter diode 38 and a detector diode 39. The emitter diode is selected to match to the detector diodes in the ceiling stations and in the handheld controller, i.e. so that it emits a maximum of infrared light at wavelengths at which the detector diodes in the ceiling stations and in the portable controller exhibit a maximum of sensitivity. The emitter diode may more specifically be of the same type as the emitter diodes in the ceiling station. According to a preferred embodiment, the emitter diode is of the above-mentioned type, Siemens LD 271.

The detector diode is in a corresponding fashion selected to have maximum sensitivity to the infrared light emitted by the transmitters in the ceiling station or in the handheld controller, and minimum sensitivity to any other kind of radiation. The detector diode may more specifically be of the same type as the detector diodes in the ceiling station.

According to a preferred embodiment, the detector diode is of the above-mentioned type, Siemens SFH 205 Q2.

The detector diode is preferably provided with a color filter adapted to suppress incident radiation at all other wavelengths than those selected for the transmission. In case the transmitters in the ceiling stations and in the portable controller comprise GaAlAs diodes emitting a maximum of radiation at 870 nm, the color filter should be adapted to be open exclusively to wavelengths within the range of 840 to 920 nm. In case the transmitters comprise GaAs diodes emitting a maximum of radiation at 950 nm, the color filter should be adapted to be open to wavelengths within the range of 920 nm to 980 nm, exclusively. Suitable color filters may be designed according to the teachings of U.S. Pat. No. 4,158,133. Alternatively, color filtering may be implemented by providing the detector diode with a cover glass filter similar to those used at the ceiling station detector diodes (described below with reference to FIG. 7).

Both of the diodes in the display tag are advantageously arranged with their axes of maximum sensitivity pointing obliquely upwards, e.g. 15 degrees upwards relative to a line perpendicular to the display front surface. The shelf display tag 30 is encapsulated in a suitable durable housing, e.g. of plastics, and is provided with mounting studs 45 on its right-hand as well as on its left-hand side, in order to provide a suitable solid mounting capable of holding the display tag firmly so it may resist unintended removal. The housing may be adapted to permit disassembling in order to make the internal components accessible to service, e.g. a battery replacement. The housing may alternatively be permanently assembled.

The shelf display tag is fitted with an internal electric power source 47 (shown in phantom). In the preferred embodiment, this power source comprises a lithium-type or an alkali-type battery having a capacity sufficient for powering e.g. three to five years of operation. In the preferred embodiment, this is obtained by a lithium-type battery of the type Panasonic BR-2/3 AA. Another possibility is an alkali-type battery of the type UCAR no. 91 or no. 92. Other possibilities are rechargeable batteries or capacitors. The solar cell 46 is used to charge the internal battery when irradiated energy is available. The display tag power supply may alternatively comprise an antenna for collecting energy from radio waves. According to a particularly preferred embodiment, the housing is adapted to allow access to the power terminals 49 from the outside so that power may be supplied from external sources, such as an externally arranged battery or a power line. External power may be used periodically for recharging the internal battery, or it may be applied continually, in which case the internal battery is not required.-Obviously, power supply systems comprising any combination of various power sources known in the art may be used.

Reference is now made to FIG. 5, showing a shelf display tag 40 for displaying graphic as well as numeric information. As evident by a comparison between FIG. 4 and FIG. 5, the two types of shelf display tags are similar as regards shape, size and layout, and the shelf display tag 40 for graphic information also comprises a plastic casing with mounting studs 45 on the sides, an internal power supply 47 (shown in phantom), to the left a solar cell 46, a logo field 36, and a transparent—or at least to infrared light transparent—window 37 covering an emitter diode 38 and a detector diode 39 of types similar to the types mentioned above. The shelf display tag 40 for graphic and numeric information also comprises six large-size digits 31 with a large decimal point 32 and six small-size digits with a small decimal point 4, which digits and decimal points are of the LCD type and controlled by the electronic circuitry inside the display units. The shelf display tag 40 differs from the shelf display tag 30 by comprising an LCD dot-matrix field 41, instead of the blank field 34, adapted for displaying graphic information. The dot matrix field may e.g. comprise 20 by 103 points, permitting the display of images with a relatively fine resolution as well as alphanumeric information. The shelf display tag 40 also comprises a large-size letter field 42, a small-size letter field 43, and a pictogram field 44, all implemented as LCD dot-matrix letter fields. All LCD fields are controlled by the electronic circuitry inside the display tag so that information may be displayed as desired.

Reference is now made to FIG. 6, which in a block-diagram form illustrates the electronic circuitry within a shelf display tag for numeric or for numeric and graphic information. As evident from FIG. 6, the incoming infrared signals are detected in the detector diode 39, from which the signals are conveyed in parallel to the input threshold detector 53 as well as to the carrier wave stage 51. The carrier wave stage comprises preamplifiers, automatic gain control, a narrow-band frequency filter matched to the carrier wave frequency, and a carrier-wave threshold detector. From the carrier wave stage 51, a signal is passed on to the demodulator 52 comprising a carrier wave detector, a phase-locked detector circuit for transforming the pulse width-modulated 1150 Baud signal from the carrier wave-modulated form to a digital form, in which form the signal is transferred to the logic circuit 55, such as a microprocessor comprising a memory, a digital data-processing unit and a timer.

The memory is adapted to store a complete set of the information to be displayed. According to a preferred embodiment, the memory has a sufficient capacity to store several sets of information, e.g. seven complete sets, and the microprocessor may comprise a program for alternating or cycling between various sets of display information. This feature enables the display to show rolling, scrolling or animation effects.

The logic circuit 55 also comprises modulator and transmitter components for producing a signal that may be emitted through the emitter diode 38 as an infrared signal, preferably at a frequency of 131 kHz and pulse width-modulated with 575 Baud of information. The logic circuit emits control signals for the LCD circuit 56 comprising LCD segment drivers and the liquid crystal display. The modulator and transmitter components of the logic circuit 55 are designed to consume substantially no power except during the transmission of signals. The LCD circuit 56 is also designed to consume virtually no power except when a signal is shown on the display.

According to a particular embodiment (not shown), a display tag is further fitted with inputs for electric signals, which may be transferred to the logic circuit, from which corresponding information in the form of infrared signals may be emitted. This feature may be utilized in a combination with a mechanism, such as a microswitch, for detecting whether a shelf is loaded or empty, in order to provide a remote indication of the need for replenishing goods.

According to the invention, the electronic circuits within the display tag are adapted so that the receiver stages comprising the carrier wave stage 51 and the demodulator 52 essentially are supplied with electric power, not continually but only under certain conditions. This is controlled by the supply logic 54, which controls power-enable signals passed on to the carrier wave stage 51 and to the demodulator 52 according to a predetermined set of rules.

When the display tag is in the normal turned-on stage, as it will typically be during normal shopping hours, power is supplied to the input threshold detector 53, the supply logic 54, the logic circuit 55 and the carrier wave stage 51. The LCD circuit 56 may be turned on or turned off, depending upon the control command from the logic circuit 55. If, during this stage, a carrier wave is broadcast, it will be detected in the carrier wave stage by means of the carrier-wave threshold detector, whereby a signal is passed on to the supply logic 54 to inform it that the display is requested to listen, whereafter the supply logic 54 transmits a power-enable signal to the demodulator 52, which is activated in order that the instruction under broadcast may be detected, decoded and passed on to the logic circuit. The supply logic 54 turns off the demodulator 52 after the expiry of the time interval necessary for receiving an instruction.

In case the remote control of the information display units is not expected to be required for any extended interval of time, e.g. while the shop is closed during the night, a special instruction is broadcast, which instruction will cause the logic circuit 55 to forward a signal to the supply logic 54 to cancel the power-enable signal for the carrier wave stage 51. The LCD circuit 56 will usually simultaneously be turned off by an instruction from the logic circuit, although the logic circuit may, in principle, control the display independently of the receiver circuits. Hereafter, only the input threshold detector 53, the supply logic 54, and the logic circuit 55 are powered. In this stage, the display tag is incapable of detecting the usual remote-control signals since the most sensitive part, i.e. the carrier wave stage 51, is unpowered. The logic circuit 55 is, therefore, advantageously provided with a programmable timer function, by which means the carrier wave stage 51 may be turned on after the expiry of a predetermined interval of time so as to allow the master station to get in contact with the display tag again.

According to the preferred embodiment, this interval of time is programmable in order that the master station, e.g. just before turning off the display unit, may instruct it as to what time to turn on again. This special facility allows a saving of energy in the display tag and thus extends the service life of its batteries. Obviously, the timer function and the memory within the display unit must be kept active and these parts are, consequently, powered at all times.

One possibility of getting in contact with the display unit, however, still remains, since the input-threshold detector 53 is active even in the rest state. This detector is adapted to have an extremely small power consumption at the expense of a lower sensitivity and, therefore, it cannot be expected to be able to detect signals emitted from the ceiling stations. A signal emitted from a portable unit, as explained above with reference to FIG. 3 and at short range from the display unit, is, however, sufficiently strong to be detected by the input-threshold detector 53, which may respond to it and pass a signal through to the supply logic 54, causing a powering-up of the carrier wave stage 51, whereafter a normal communication with the display tag is possible. The display tag may, then, respond to other signals from the portable unit or to usual signals from the master station. Obviously, the turn-off of the display tag may be effected by issuing a specific turn-off instruction, or the display tag may advantageously be adapted to turn off by itself after the expiry of a suitable interval of time.

The possibility of 'waking up' a turned-off system is advantageous, e.g. when service personnel are working in the store after normal opening hours, replenishing the shelves with goods, and perhaps wanting to ask the display tag for information. The information contained in the display tag memory may comprise a ware-identification number, a ware description, a group number, an address, a program (e.g. cycling among several display messages), a status field (e.g. with information about the latest update), or other information as desired. The status field may record information about calls made from the portable unit in order that, later on upon a request, the master station may get information from the display tags about which of the display tags the service personnel have actually called up.

Reference is now made to FIG. 7, showing a sectional view through the ceiling station of FIG. 2 in greater detail.

FIG. 7 shows more particularly how the receiver diodes 14 arranged at the pyramidal region 13 of the ceiling station are mounted on a base 60 behind covering glasses 61 held by fixtures 62. The covering glasses are provided with color filters adapted to let through infrared light within the range of wavelengths selected for the communication link and to dampen out radiation at other wavelengths, in particular within the general sensitivity range of the photoelectric detectors 14.

In case the display tag emitters comprise GaAlAs diodes emitting a maximum of radiation at 870 nm, the color filters should be open to wavelengths within the range of 840 nm to 920 nm, exclusively. In case the display tag emitters comprise GaAs diodes emitting a maximum of radiation at 950 nm, the color filters should be open to wavelengths within the range of 920 nm to 980 nm, exclusively. Color filtering may be achieved by designing the detector diodes in accordance with the teachings of U.S. Pat. No. 4,158,133. Alternatively, a highly effective color filter may be implemented by depositing on the inside of the covering glasses 61 a large number of very thin layers of two materials with different indicies of refraction, 63 and 64, in alternating manner. The material used may be taken from the group of aluminium oxide ($Al_2O_3$), germanium (Ge), silicon (Si), silicon oxide (SiO), silicon dioxide ($SiO_2$), titanium dioxide ($TiO_2$), zirconium dioxide ($ZrO_2$), tantalum pentoxide ($Ta_2O_5$), magnesium fluoride ($MgF_2$), silver (Ag), or aluminium (Al). According to a preferred embodiment, one of the materials comprises $SiO_2$ and the other one comprises a mixture of $TiO_2$ and $ZrO_2$. The thickness of each layer may be in the range of one half to one quarter of the wavelength to be let through. Although, for the simplicity of illustration, FIG. 7 only shows a small number of layers, it is understood that the practical filter may comprise as many as one hundred layers, and preferably about 45 layers; each of a thickness of about a quarter of the wavelength of the infrared light, which is to pass the filter. These layers together form an interference filter with excellent capabilities of narrow-band filtering of light for maximum ratio between desired and undesired light signals. The interference filters are, in particular, well suited for suppressing infrared radiation at the wavelengths of 1014 nm and 1051 nm known to be produced by fluorescent lamps and therefore likely to be present in shopping environments. The interference filters may also be combined with an absorption color filter 65, which is well suited for suppressing the influence of light at wavelengths below 840 nm or 920 nm, such as daylight and visible light.

Although, various components are described above in concert, it is obvious that many of the components may also be used in other combinations or contexts. Although, specific components and quantities are mentioned, it is obvious that these are only offered as examples and that numerous modifications may be made within the scope of the invention as defined by the appended patent claims.

I claim:

1. A system for displaying information, said system comprising:

a master computer including storage means for storing an instruction signal and a verification signal, infrared signal transmitting means operatively connected to said storage means for transmitting an infrared signal, and infrared signal receiving means operatively connected to said storage means for receiving an infrared signal, a plurality of individual information units for the displaying of individual information, each information unit comprising a housing, displaying means included in said housing and exposed at said housing for displaying said individual information, digital memory means included in said housing and operatively connected to said displaying means, infrared signal detecting means for detecting an infrared signal transmitted from said infrared signal transmitting means of said master computer, said infrared signal detecting means being included in said housing and being operatively connected to said digital memory means, and infrared signal emitting means for emitting an infrared signal to said infrared signal receiving means of said master computer, said infrared signal emitting means being included in said housing and being operatively connected to said digital memory means, said digital memory means of each information unit controlling the displaying of said individual information of said displaying means thereof in response to the detection of said instruction signal transmitted from said infrared signal transmitting means of said master computer and received by said infrared signal detecting means, and controlling said infrared signal emitting means for emitting said verification signal to said infrared signal receiving means of said master computer, and said infrared signal receiving means of said master computer, upon receipt of said verification signal by said master computer, confirming proper detection of said instruction signal by said information unit.

2. A system for displaying information, said system comprising:

a master computer including storage means for storing instruction signals and verification signals, infrared signal transmitting means operatively connected to said storage means for transmitting an infrared signal, and infrared signal receiving means operatively connected to said storage means for receiving an infrared signal, a plurality of individual information units for the displaying of individual information, each information unit comprising a housing, displaying means included in said housing and exposed at said housing for displaying said individual information, digital memory means included in said housing and operatively connected to said displaying means, infrared signal detecting means for detecting an infrared signal transmitted from said infrared signal transmitting means of said master computer, said infrared signal detecting means being included in said housing and being operatively connected to said digital memory means, and infrared signal emitting means for emitting an infrared signal to said infrared signal receiving means of said master computer, said infrared signal emitting means being included in said housing and being operatively connected to said digital memory means, said digital memory means of each information unit controlling the displaying of said individual information of said displaying means thereof in response to the detection of a specific instruction signal transmitted from said infrared signal transmitting means of said master computer and received by said infrared signal detecting means, and controlling said infrared signal emitting means for emitting a verification signal to said infrared signal receiving means of said master computer, and said master computer comparing said verification signal received by said receiving means thereof with said verification signals stored in said storage means for verifying the proper detection of said specific instruction signal by the intended information unit.

3. The system according to claim 2, wherein said digital memory means of each information unit stores a specific address corresponding to a portion of said specific instruction signal for deciding whether an infrared signal emitted from said infrared signal transmitting means of said master computer is addressed to the particular information unit.

4. The system according to claim 3, wherein each information unit responds to instruction signals specifically addressed to the unit and also to instruction signals not specifically addressed to any information unit.

5. The system according to claim 3, wherein said digital memory means of each information unit stores a group address, which is common to a number of information units, and responds to instruction signals addressed to the group identified by said group address.

6. The system according to claim 2, wherein said specific instruction signal selectively includes an instruction to turn off said display means.

7. The system according to claim 2, wherein said specific instruction signal selectively includes an instruction to turn on said display means.

8. A system for displaying information, said system comprising:

a master computer including storage means for storing an instruction signal and a verification signal, infrared signal transmitting means operatively connected to said storage means for transmitting an infrared signal, and infrared signal receiving means operatively connected to said storage means for receiving an infrared signal, a plurality of individual information units for the displaying of individual information, each information unit comprising a housing, displaying means included in said housing and exposed at said housing for displaying said individual information, digital memory means included in said housing and operatively connected to said displaying means, timer means included in said housing and operatively connected to said digital memory means and said display means, and infrared signal emitting means for emitting an infrared signal to said infrared signal receiving means of said master computer, said infrared signal emitting means being included in said housing and being operatively connected to said digital memory means, said digital memory means of each information unit controlling the displaying of said displaying means thereof by turning off said display means for a predetermined period of time determined by said timer means in response to the detection of an instruction signal including an instruction to turn off said display means transmitted from said infrared signal transmitting means of said master computer and received by said infrared signal detecting means, and controlling said infrared signal emitting means for emitting a verification signal to said infrared signal receiving means of said master computer, and said infrared signal receiving means of said master computer, upon receipt of said verification signal by said master computer, confirming proper detection of said instruction signal by said information unit.

9. The system according to claim 8, wherein said predetermined period of time is encoded into said digital memory means.

10. The system according to claim 8, wherein said predetermined period of time is modified by an instruction signal including an instruction to modify the predetermined period of time transmitted from said master computer.

11. A system for displaying information, said system comprising:

a master computer including storage means for storing an instruction signal and a verification signal, infrared signal transmitting means operatively connected to said storage means for transmitting an infrared signal, and infrared signal receiving means operatively connected to said storage means for receiving an infrared signal, a plurality of individual information units for the displaying of individual information, each information unit comprising a housing, displaying means included in said housing and exposed at said housing for displaying said individual information, digital memory means included in said housing and operatively connected to said displaying means, power supply means included in said housing and operatively connected to said digital memory means and said display means, infrared signal detecting means for detecting an infrared signal transmitted from said infrared signal transmitting means of said master computer, said infrared signal detecting means being included in said housing and being operatively connected to said digital memory means, and infrared signal emitting means for emitting an infrared signal to said infrared signal receiving means of said master computer, said infrared signal emitting means being included in said housing and being operatively connected to said digital memory means, said digital memory means of each information unit controlling the displaying of said displaying means thereof by placing said power supply means into a power-down mode in response to the detection of a first instruction signal transmitted from said infrared signal transmitting means of said master computer and received by said infrared signal detecting means, and controlling said infrared signal emitting means for emitting a first verification signal to said infrared signal receiving means of said master computer, and said infrared signal receiving means of said master computer, upon receipt of said verification signal by said master computer, confirming proper detection of said instruction signal by said information unit.

12. The system according to claim 11 wherein said digital memory means of each information unit controls the displaying of said displaying means thereof by placing said power supply means into a power-up mode in response to the detection of a second instruction signal transmitted from said infrared signal transmitting means of said master computer and received by said infrared signal detecting means, and controls said infrared signal emitting means for emitting a second verification signal to said infrared signal receiving means of said master computer, and wherein said infrared signal receiving means of said master computer, upon receipt of said second verification signal by said master computer, confirms proper detection of said second instruction signal by said information unit.

13. The system according to claim 2, wherein said information unit stores status information in said digital memory, and wherein said information unit emits said status information upon the receipt of an instruction signal including a special interrogation instruction from said master computer.

14. The system according to claim 2, said information unit further being provided with input terminals for connection to external signalling equipment for receiving signals input through said input terminals and for storing said signals in said digital memory means.

15. The system according to claim 2, wherein said infrared signal transmitting means of said master computer transmits said specific instruction signal transferred from said storage means constituted by an instruction in combination with a number identifying said instruction, and wherein each information unit responds to the receipt of said instruction signal by retransmitting said number constituting said verification signal.

16. The system according to claim 2, wherein said master computer comprises a transponder including said infrared signal transmitting means and said infrared signal receiving means.

17. The system according to claim 16, wherein said transponder comprises at least one diode constituting said infrared signal transmitting means.

18. The system according to claim 16, wherein said transponder comprises at least one photodiode constituting said infrared signal receiving means.

19. The system according to claim 2, wherein said information unit comprises carrier wave stage means for detecting a carrier wave and a demodulator means, and wherein said information unit supplies electric power to said demodulator means upon detection of a carrier wave by said carrier wave stage means for a period of time allowing said demodulator means to receive said instruction signal.

20. The system according to claim 19, wherein said information unit further comprises input threshold detector means for detecting a powerful infrared signal, even at times when said carrier wave stage is unpowered, and for responding to said powerful signal by powering said carrier wave stage for a period of time allowing said demodulator means to receive said instruction signal.

21. The system according to claim 2, wherein said information unit is battery-powered.

22. A system for displaying information, said system comprising:

a master computer including storage means for storing an instruction signal and a verification signal, infrared signal transmitting means operatively connected to said storage means for transmitting an infrared signal, and infrared signal receiving means operatively connected to said storage means for receiving an infrared signal, a plurality of individual information units for the displaying of individual information, each information unit comprising a housing, displaying means included in said housing and exposed at said housing for displaying said individual information, digital memory means included in said housing and operatively connected to said displaying means, infrared signal detecting means for detecting an infrared signal transmitted from said infrared signal transmitting means of said master computer, said infrared signal detecting means being included in said housing being operatively connected to said digital memory means, and infrared signal emitting means for emitting an infrared signal to said infrared signal receiving means of said master computer, said infrared signal emitting means included in said housing and being operatively connected to said digital memory means, said digital memory means of each information unit controlling the displaying of said individual information of said displaying means thereof in response to the detection of said instruction signal transmitted from said infrared signal transmitting means of said master computer and received by said infrared signal detecting means, and controlling said infrared signal emitting means for emitting a verification signal to said infrared signal receiving means of said master computer, said infrared signal receiving means of said master computer, upon receipt of said verification signal by said master computer, confirming proper detection of said instruction signal by said information unit, and a portable unit comprising a housing, infrared signal transmission means for transmitting an infrared signal, said infrared signal transmission means being included in said portable unit housing, manual activation means included in said portable unit housing and operatively connected to said infrared signal transmission means for activating said infrared signal transmission means for transmitting an infrared signal, and directional delimiting means for directional delimiting said infrared signal transmitting from said infrared transmission means to a predetermined angular region centered around a longitudinal axis of said portable unit in order that said infrared signal transmitted from said infrared signal transmission means be directed from said portable unit within said predetermined angular region so as to prevent the information units located outside said angular region from detecting said infrared signal emitted from said infrared signal transmission means of said portable unit.

23. The system according to claim 22, wherein said digital memory means of each information unit stores a specific address corresponding to a portion of said specific instruction signal for deciding whether an infrared signal emitted from said infrared signal transmitting means of said master computer is addressed to the particular information unit.

24. The system according to claim 23, wherein each information unit responds to instruction signals specifically addressed to the unit and also to instruction signals not specifically addressed to any information unit.

25. An information unit of a system for displaying information, said system comprising:

a master computer including storage means for storing an instruction signal and a verification signal, infrared signal transmitting means operatively connected to said storage means for transmitting an infrared signal, and infrared signal receiving means operatively connected to said storage means for receiving an infrared signal, and a plurality of individual information units for the displaying of individual information, said information unit comprising: a housing, displaying means included in said housing and exposed at said housing for displaying said individual information, digital memory means included in said housing and operatively connected to said displaying means, infrared signal detecting means for detecting an infrared signal transmitted from said infrared signal transmitting means of said master computer, said infrared signal detecting means being included in said housing and being operatively connected to said digital memory means, and infrared signal emitting means for emitting an infrared signal to said infrared signal receiving means of said master computer, said infrared signal emitting means being included in said housing and being operatively connected to said digital memory means, and said digital memory means of each information unit controlling the displaying of said individual information of said displaying means thereof in response to the detection of said instruction signal transmitted from said infrared signal transmitting means of said master computer and received by said infrared signal detecting means, and controlling said infrared signal emitting means for emitting a verification signal to said infrared signal receiving means of said master computer, and said infrared signal receiving means of said master computer, upon receipt of said verification signal by said master computer, confirming proper detection of said instruction signal by said information unit.

26. The system according to claim 25, wherein said digital memory means of each information unit stores a specific address corresponding to a portion of said specific instruction signal for deciding whether an infrared signal emitted from said infrared signal transmitting means of said master computer is addressed to the particular information unit.

27. The system according to claim 26, wherein each information unit responds to instruction signals specifically addressed to the unit and also to instruction signals not specifically addressed to any information unit.

28. A portable unit of a system for displaying information, said system comprising:

a master computer including storage means for storing an instruction signal and a verification signal, infrared signal transmitting means operatively connected to said storage means for transmitting an infrared signal, and infrared signal receiving means operatively connected to said storage means for receiving an infrared signal, a plurality of individual information units for the displaying of individual information, each information unit comprising a housing, displaying means included in said housing and exposed at said housing for displaying said individual information, digital memory means included in said housing and operatively connected to said displaying means, infrared signal detecting means for detecting an infrared signal transmitted from said infrared signal transmitting means of said master computer, said infrared signal detecting means being included in said housing and being operatively connected to said digital memory means, and infrared signal emitting means for emitting an infrared signal to said infrared signal receiving means of said master computer, said infrared signal emitting means being included in said housing and being operatively connected to said digital memory means, said digital memory means of each information unit controlling the displaying of said individual information of said displaying means thereof in response to the detection of said instruction signal transmitted from said infrared signal transmitting means of said master computer and received by said infrared signal detecting means, and controlling said infrared signal emitting means for emitting a verification signal to said infrared signal receiving means of said master computer, and said infrared signal receiving means of said master computer, upon receipt of said verification signal by said master computer, confirming proper detection of said instruction signal by said information unit, said portable unit comprising: a housing, infrared signal transmission means for transmitting an infrared signal, said infrared signal transmission means being included in said portable unit housing, manual activation means included in said portable unit housing and operatively connected to said infrared signal transmission means for activating said infrared signal transmission means for transmitting an infrared signal, and directional delimiting means for directional delimiting said infrared signal transmitting from said infrared transmittal means to a predetermined angular region centered around a longitudinal axis of said portable unit in order that said infrared signal transmitted from said infrared signal transmission means be directed from said portable unit within said predetermined angular region so as to prevent that information units located outside said angular region detects said infrared signal emitted from said infrared signal transmission means.

* * * * *